Feb. 29, 1944.    R. ADLER    2,343,165
PROCESS FOR RECOVERING PHENOLS FROM WASTE WATERS AND APPARATUS
FOR USE IN CARRYING SAME INTO EFFECT
Filed Nov. 13, 1939
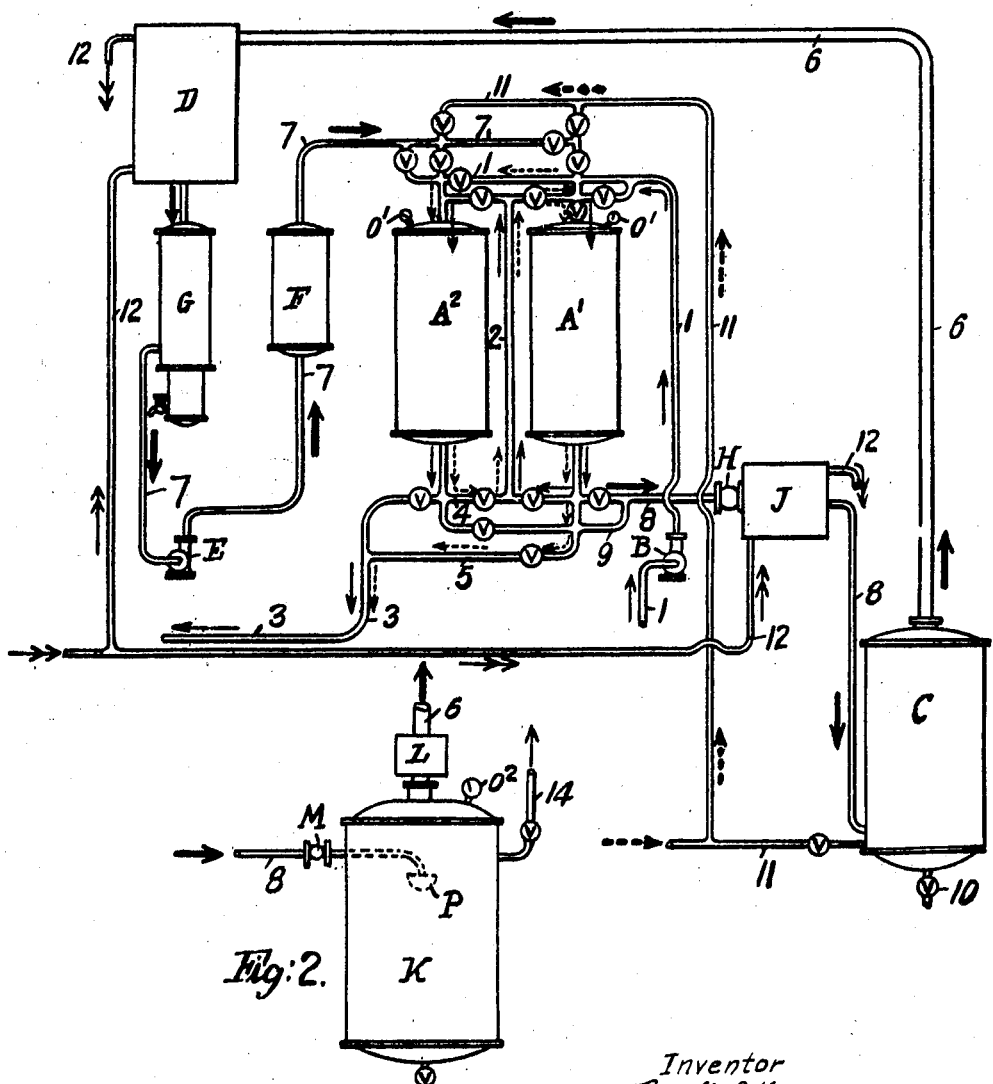
Inventor
Rudolf Adler
BY
Mock & Blum
Attorneys

UNITED STATES PATENT OFFICE 2,343,165

PROCESS FOR RECOVERING PHENOLS FROM WASTE WATERS AND APPARATUS FOR USE IN CARRYING SAME INTO EFFECT

Rudolf Adler, London, England

Application November 13, 1939, Serial No. 304,199
In Great Britain November 19, 1938

1 Claim. (Cl. 260—627)

The present invention relates to a process for recovering phenols from waste waters and to apparatus for use in carrying same into effect.

The waste waters of gas works and of coke, charcoal, and power gas plants contain, in addition to other substances, a substantial percentage of phenols, cresols, and the homologues thereof.

These substances which will hereinafter be generally termed "phenols" may be removed in a manner known per se, by the waste water being passed over or through an adequately thick layer of activated carbon, which adsorbs the phenols, thus removing them from the water.

The activated carbon, saturated with the phenols may be revived and rendered fit for repeated use by extracting these phenols with suitable solvents which readily dissolve them, as for example benzol, alcohols, chlorinated hydrocarbons or the like and mixtures of these substances.

The solvents may be recovered for further use by distilling them off from the phenols dissolved therein, so that the phenols may be disposed of in any commercial way.

The quantity of phenols adsorbed from the waste water, per unit of weight of the activated carbon depends firstly on the adsorptive power of the activated carbons used, and it is therefore of advantage to use active carbons of a high adsorptive power for this purpose.

On the other hand, it is found, in practice, that when the phenol is extracted from the carbon with solvents such as those mentioned above, a substantial portion of the phenols are retained in the carbon and that this portion is proportional to the adsorptive power thereof, that is to say, that an active carbon retains the more phenol, the greater its activity.

The result of this is that activated carbon which has been previously used possesses a smaller phenol adsorbing capacity than fresh activated carbon and that this capacity is reduced in proportion to the phenol remnant remaining in the activated carbon.

To reduce this residual portion of phenol remaining in the activated carbon after extraction and to increase the adsorptive capacity of the previously used activated carbon is the object of the present invention.

The present invention consists in a phenol extracting process of the afore-described type, wherein an organic solvent which is normally liquid is used at a temperature far above its normal boiling point and while so used is maintained at a high pressure to thereby keep it in its liquid condition.

This increase of temperature and pressure results in a considerable increase of the phenol dissolved from the activated carbon, and in a proportionate increase of the adsorptive capacity of the revived carbon, for subsequent use.

After the action of the solvent on the phenol saturated carbon, the recovery of the phenol is effected in the usual way, that is to say, by an evaporation of the solvent, whereby the phenol, having a higher evaporation point, forms the residue in the evaporator.

The liquid solvent containing the phenols may be reduced in temperature while the pressure is being reduced, so that at normal or atmospheric pressure it will remain in its liquid condition to thus enable a subsequent evaporation by the application of heat in a manner such as to leave the phenols as the residue.

This may be effected, for example, by passing the solvent containing the phenols through a mechanically acting pressure reducing valve and a suitable cooling device, whereupon the solvent which has thus been cooled down to below its normal boiling point is evaporated at normal atmospheric pressure by another admission of heat, in order to separate it from the higher boiling phenols.

A more economic method of separating the solvent from the phenols, which avoids a further heat treatment consists in that the phenol containing solvent, after having been passed through the active carbon, is directly passed into an expansion chamber, where the solvent is at once permitted to expand and thus to evaporate, the specific rate of inflow of the solvent to the expansion chamber and the volume of the latter being so related, that by the heat consumed on evaporation, the requisite temperature is obtained, at which the solvent is transformed into its vaporous form, while the phenols, or, alternatively, their watery solution, remains liquid.

The phenols or phenol-water mixtures are drained off from the expansion chamber at suitable intervals, while the vaporous solvent is passed on to coolers and condensed, and may be used again for a further extraction.

In addition to the advantage already referred to, of increasing the quantity of phenols recovered from the active carbon after extraction, and of preserving a high adsorptive capacity of the active carbon, the new phenol extracting process has the further advantage, that the active carbon may be used in a finely powdered condition, as the passage through it of the solvent is rendered possible by the high pressure acting on the solvent while it flows through the layer of active carbon.

This presents the further advantage that a smaller apparatus and smaller quantities of solvent may be used for the extraction of the phenols from a given quantity of active carbon, than with the processes heretofore proposed.

A form of apparatus which has been found to be very efficient in the carrying out of the process forming the subject of the present invention is illustrated, diagrammatically, in the accompanying drawing, in which:

Fig. 1 is a diagrammatic view of one form of apparatus in which the invention can be carried into effect.

Fig. 2 is a view showing a certain modification.

Referring to Fig. 1 of the accompanying drawing, it will be seen that the finely powdered activated carbon is contained in the receptacles $A^1$ and $A^2$ (adsorbers). The phenol containing waste water is forced by a pump B through a tube 1, first into the adsorber $A^1$ and through the connecting tube 2, into the adsorber $A^2$, as shown by the thin arrows, the dephenolated waste water being discharged through the discharge tube 3.

As soon as the activated carbon in the adsorber $A^1$ is saturated with phenols, the extraction with a solvent, described hereinafter more in detail, is effected, and at the end of such extraction, the stop valves V are so readjusted as to cause the phenol containing waste water to flow first through the adsorber $A^2$ and then through the adsorber $A^1$, as shown by the thin arrows formed of dotted lines, the dephenolated water then passing out through the aforesaid discharge tube 3.

As soon as the active carbon within the adsorber $A^2$ has become saturated with phenols, the latter are extracted from it by passing through it a suitable solvent, in the manner to be hereinafter described, after which the valves are readjusted to their initial setting.

The dissolving out of the phenols from the carbon in the adsorbers $A^1$ and $A^2$ is effected as follows:

In an evaporator C, which is provided with heating means (not shown), the liquid solvent is evaporated, the vapour so driven off passing, by way of a tube 6, to a condenser D where the vapour is condensed.

The liquid formed by this condensation passes, by way of the tube 7 either to the adsorber $A^1$ or to the adsorber $A^2$, the stop valves V being appropriately set according to which one of these adsorbers the solvent is to be passed through.

In order to obtain the pressure necessary for increasing the temperature of the boiling point of the solvent, the pump E is provided, the necessary increase of temperature of the solvent being effected by the heater F.

Preferably a water separator G is arranged in the conduit 7, in order to free the solvent from any water particles it may be carrying along with it, the solvent passing to and through the pump E, as shown by the thick arrows.

When the phenols are to be dissolved from the carbon contained in the adsorber $A^1$, the stop valves V are so adjusted that the superheated solvent under pressure flows through the tube 7 into the adsorber $A^1$ and through the tube 8, into the evaporator C.

If however the phenols are to be dissolved from the carbon in the adsorber $A^2$, the stop valves V are so adjusted that the superheated solvent under pressure flows through the tube 7, into the adsorber $A^2$, thence through tubes 9 and 8, into the evaporator C.

In order that the above described process may be carried out, it is necessary that a further element be included in the pipe 8, in order that both the pressure and the temperature of the solvent shall be reduced just prior to its passage into the evaporator C.

Consequently a pressure reducing valve H is provided in combination with a cooler J, these respectively so being adjusted and operated that the pressure of the solvent is reduced to normal atmospheric pressure and its temperature is reduced to a temperature below that of the normal boiling point of the solvent, as the reduction of pressure without such a reduction of temperature would cause instantaneous vaporization of the solvent.

The further evaporation of the solvent returned to the evaporator C in the manner just described will, therefore, only take place upon further heat being applied to this solvent after it has been so returned to the evaporator, as a result of which further evaporation, the phenols will form a residue which may be drained off at intervals, through a drainage cock 10.

As will be readily seen from the foregoing description, the solvent from the evaporator C may be continually circulated through the carbon until as much as possible of the phenols have been dissolved therefrom.

After the treatment of the carbon with the solvent, in the manner just described, a certain quantity of solvent remains in the carbon, and this is driven off in the usual manner by passing steam through the carbon, the steam being admitted to the system through a pipe 11, after the various stop valves V have been appropriately manipulated, this steam passing along in the direction of the arrows formed by the thick dotted lines.

The cooling of the coolers J and D is effected by water which is passed through the tubes 12, in the directions shown by the double headed arrows.

If desired, the tube 11 may have a branch pipe passing through the evaporator C and constituting the heater therefor, this branch pipe being also indicated by 11 and having in it a stop valve V.

In larger plants, particularly those where they are intended for continuous operation, it is necessary to provide a greater number of adsorbers than there is in the plant just described, in which case each adsorber would contain sufficient activated carbon for it not to be necessary to operate these adsorbers in series but individually for extracting the phenols from the waste water, and the arrangement would be such that while one adsorber would be having solvent passed therethrough another adsorber would be having the waste water passed through it, and vice versa.

A further development of the above described apparatus, which permits a much more convenient operation and a reduction of installation and operation costs is shown in Fig. 2. The elements shown in Fig. 1, namely, the two adsorbers $A^1$ and $A^2$, the water pump B, cooler D, water separator G, pressure pump E, and the heater F remain the same, as described, but the evaporator C, the pressure relief valve H and the cooler J are dispensed with.

In place of the three elements C, H and J, an expansion chamber K is provided, into which the tube 8 (Fig. 1) is led, the end of this tube within said chamber having thereon a spray nozzle or equivalent device.

The upper end of the expansion chamber K is connected with the cooler D, as is the evaporator C in the arrangement shown in Fig. 1, a liquid trap L preferably being provided in the tube 6 to trap any phenol which may have been carried into said tube, and return it to the expansion chamber.

In this arrangement, the solvent, on account of the relief of pressure thereon caused as it passes into the expansion chamber, immediately evaporates as it leaves the nozzle, and this being without the application of heat in this part of the plant, moreover the low boiling point phenols and phenol-water mixtures separate out and collect at the bottom of the expansion chamber K, from where they may be drained off at intervals through the cock 13.

In order to regulate the pressure conditions in the expansion chamber K, the pipe 8 is provided either with a manually operated or with an automatically operated regulating valve M.

If for any reason this valve should fail to operate or to be operated, as the case may be, a safety valve N will operate in the event of the pressure within the chamber becoming excessive and will permit the vapourized solvent to escape through the tube 14.

To enable the pressure condition prevailing in the adsorbers $A^1$ and $A^2$ to be controlled, as well as the pressure in the expansion chamber K, these three respective elements are provided with pressure gauges $O^1$, $O^1$, and $O^2$.

I claim:

In a process for recovering phenols from phenol-containing industrial waste liquids by means of active carbon, the steps of extracting from the active carbon the adsorbed phenols by an organic solvent, of the class consisting of benzol, alcohols, and chlorinated hydrocarbons, which is normally liquid, at a temperature far above its normal boiling point and at such an increased pressure that its evaporation during the said extraction is prevented, and permitting said solvent to expand in a closed space after its passage through the carbon so as to separate, by evaporation, from its phenol content, the quantity of phenol containing solvent admitted to the expansion space in a given time being so related to the volume of said expansion space that the temperature existing within the said expansion space is maintained above the boiling point of the solvent, but below the boiling point of the phenols contained therein.

RUDOLF ADLER.